Nov. 5, 1940.  S. B. GRIMSON  2,220,233
COLOR PHOTOGRAPHY
Original Filed April 21, 1939   3 Sheets-Sheet 1
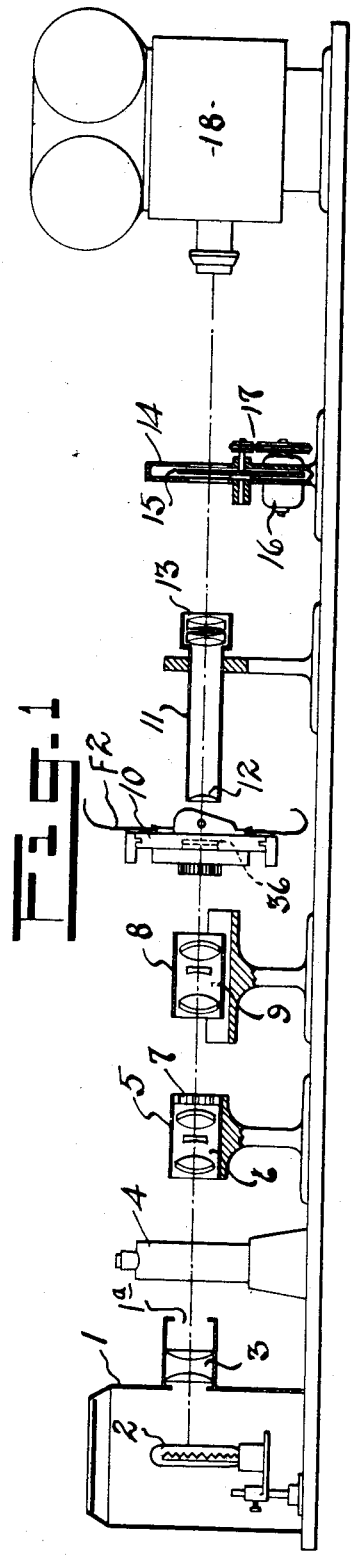
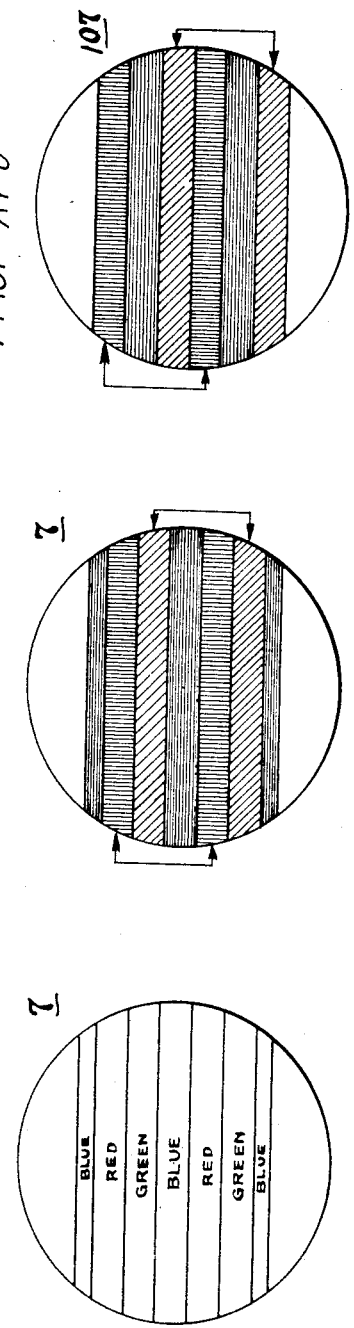
INVENTOR.
Samuel B. Grimson
Darby & Darby
His Attorneys Nov. 5, 1940.  S. B. GRIMSON  2,220,233
COLOR PHOTOGRAPHY
Original Filed April 21, 1939  3 Sheets-Sheet 2
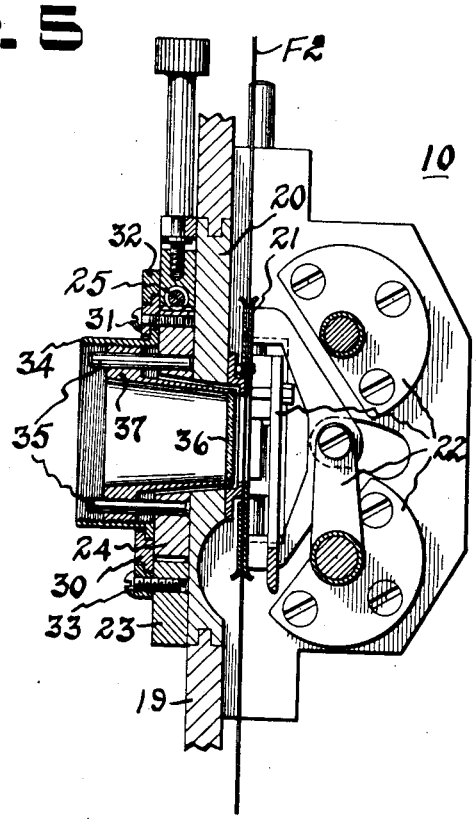
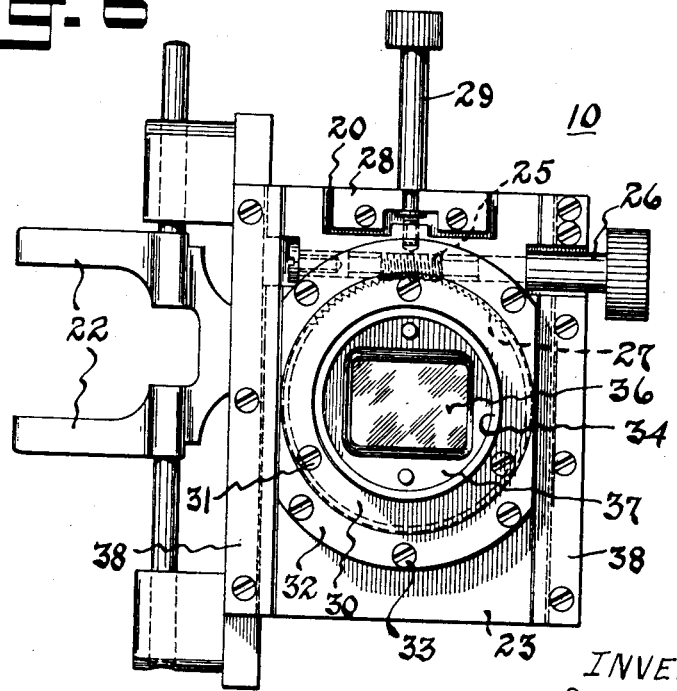
INVENTOR.
Samuel B. Grimson
Danby & Danby
His Attorneys.

Nov. 5, 1940.  S. B. GRIMSON  2,220,233
COLOR PHOTOGRAPHY
Original Filed April 21, 1939   3 Sheets—Sheet 3

Fig. 7

36 — Diffraction Grating

1st Focus

F — Overlapping focus

Fig. 8

BLACK & WHITE NEG.  RED TARGET   BLACK TARGET   YELLOW TARGET

Fig. 9

BLACK & WHITE POS.

Fig. 10

MONO. NEG.
BLUE LAYER
GREEN LAYER
RED LAYER
BASE

Fig. 11

MONO. POS.
BLUE LAYER
GREEN LAYER
RED LAYER

INVENTOR.
Samuel B. Grimson
Darby & Darby
His Attorney's

Patented Nov. 5, 1940

2,220,233

UNITED STATES PATENT OFFICE 2,220,233

COLOR PHOTOGRAPHY

Samuel B. Grimson, New York, N. Y., assignor to Color Research Corporation, New York, N. Y., a corporation of Delaware Original application April 21, 1939, Serial No. 269,068. Divided and this application March 14, 1940, Serial No. 323,887

8 Claims. (Cl. 88—24)

This invention relates to methods of taking and printing colored photographs, including motion pictures, which as compared to prior known processes are greatly simplified.

An important object of this invention is the provision of a novel method of color photography in which a multi-color separation negative in full frame size, each frame bearing the three separations, is made in black and white employing a single negative.

Another object of this invention involves a novel method of printing additive multi-color mono-pack negatives and positives.

Another object of this invention is the provision of a novel method of producing additive multi-color mono-pack negatives and positives using the conventional dye coupling procedure.

Another object of this invention is the provision of a novel form of apparatus by means of which additive multi-color mono-pack negatives and positives may be printed.

A further object of this invention is the provision of a novel and vital form of mechanism for adjusting the diffraction grating employed in such printing apparatus.

A still further object of this invention is the provision of a novel form of multi-color filter for use in both the taking and printing processes and apparatus.

A still further object of this invention is the production of a new form of multi-color mono-pack negative and positive in additive color.

Many additional objects and advantages of this invention will be apparent from the following detailed description thereof.

This invention resides substantially in the combination, construction, arrangement, relative location of parts, steps and series of steps, as hereinafter more fully explained.

This application is a division of my co-pending application Serial No. 269,068, filed April 21, 1939 for Color photography.

In the accompanying drawings,

Figure 1 is a side elevational view with some parts in cross-section of the printing apparatus of this invention shown somewhat in diagrammatic form;

Figure 2 is a front elevational view of the novel multi-color filter of this invention;

Figure 3 is a similar view thereof disclosing symbolically the various colors of this filter;

Figure 4 is a view similar to Figure 3 of the usual type of corresponding filter previously known;

Figure 5 is a vertical, central, cross-sectional view of the novel unitary structure comprising the film gate, the diffraction grating, and the adjusting mechanism therefor of this invention;

Figure 6 is a rear elevational view thereof;

Figure 7 is a diagrammatic view illustrating the manner of light transmission through a multiple band multi-color filter such as that shown in Figures 2 and 3 and a diffraction grating as employed in both the taking and the printing methods of this invention;

Figure 8 is a diagrammatic side view of a black and white multi-color separation negative as taken in accordance with this invention;

Figure 9 is a positive print therefrom;

Figure 10 is a diagrammatic side view of a mono-pack negative printed from the black and white positive of Figure 9 in accordance with this invention; and Figure 11 is a mono-pack positive printed therefrom in accordance with this invention.

In some respects the subject matter herein disclosed is related to the subject matter of my co-pending application Serial No. 176,440, filed November 26, 1937, for Diffraction method and apparatus for color photography, which has matured into Patent No. 2,164,062, dated June 27, 1939.

Speaking generally, the important objects of this invention are to greatly simplify the processing of negative and positive films as now produced by several well known methods of color photography. For example, in accordance with this invention as distinguished from prior known methods, an ordinary black and white multi-color separation negative is made of the scene to be photographed in an ordinary camera in conjunction with the simple accessories of a multi-color filter and an adjustably positioned diffraction grating. A multi-color mono-pack negative is printed and processed with relative simplicity from a black and white positive of the multi-color separation negative with the aid of relatively simple equipment likewise employing a multi-color filter and a diffraction grating. By this procedure the difficulties and slowness involved in the production of a plurality of color separation negatives and the difficulties of registration thereof during printing, as well as the multiplicity of processing steps involved in such procedure, are either eliminated or greatly reduced. By means of this invention printing in multiple colors is effected in one operation with perfect registration, and the printed film thereafter processed continuously to completion. A very important feature of this invention is the production of additive multi-color mono-pack negatives and positives by means of which greater light intensities from a given source result in the projected picture, as well as purer colors less subject to variation per se are produced than when successive prints are made by the method of printing complementary colors one upon the other to achieve mixtures of colors. These results are secured optically by this invention by the juxtaposition of colors which do not vary.

In taking pictures, whether they be stills or motion pictures, in accordance with this invention the procedure is generally like that disclosed in my above-entitled application with the exception that the novel filter herein disclosed is employed. The filter, as illustrated in Figures 2 and 3, has two series of primary colors. With the usual three-band tri-color filter the resultant image of a white target will be tinted in the reverse order of the filter bands. Heretofore unsuccessful efforts have been made to overcome this by employing two or more series of tri-color bands in the filter but without substantial success. In accordance with this invention a novel form of filter is provided, and as illustrated it comprises two series of tri-color bands arranged as shown in Figures 2 and 3. At the transverse central axis one of the color bands, blue for example, is positioned so as to lie equally on opposite sides of that axis. The two bands of each of the other two colors are arranged as shown on opposite sides of the central blue band. The second blue band is split longitudinally into two smaller bands of equal width, one-half of which is placed above the upper red band and the other half of which is placed below the lower green band. The blue bands are then symmetrical with respect to the horizontal axis of the filter as is the case of the prior arrangement, as illustrated in Figure 4. But whereas in the case of Figure 4 the symmetry of the other two colors is greatly upset, in the new arrangement of this invention it is improved by fifty percent. In the one case there is a discrepancy width of two bands, and in the other of only one band, in relation to the horizontal central axis of the filter. The final result of this arrangement is to retain the symmetrical position of the blue color or the particular color selected for the central position while increasing this quality in the other two colors by one full band in each case as may be seen. By the use of such filter it is possible to get a uniform distribution of the colors on a screen, producing a field of uniform whiteness.

In taking color pictures in accordance with this invention an ordinary camera, such as the usual motion picture camera, is employed in conjunction with the three-color filter of Figures 2 and 3 with the filter, of course, placed preferably between the lens system of the camera and the scene being photographed. Interposed between the lens system and the unexposed black and white negative film is a diffraction grating, the position of which may be adjusted with respect to the film, as will be explained in detail later. This grating consists of a series of lines extending horizontally across one surface of a glass plate made by ruling them thereon and filling them in in accordance with known practice so that the ruled lines are separated by clear lines which are preferably one-third as wide as the ruled or opaque lines. By way of example, it is preferable to use a grating of this type having 500 ruled lines to the inch, providing thereby 500 clear lines therebetween. The glass plate thus ruled is preferably one made of a piece of white, plane-parallel, optical glass. With the apparatus thus set up the picture to be photographed is focused on the film and the diffraction grating is placed with respect to the film to bring the images of the color filter to a focus on the film. As illustrated in Figure 7, the diffraction grating is positioned in a plane with respect to the emulsion side of the negative so that the ruled lines are exactly horizontal and the images of the color filter are focused at the plane of the emulsion at the overlapping focus of the diffraction grating. Thus, in Figure 7, the plane of the ruled lines of the diffraction grating 36 is illustrated diagrammatically by a line. The plane of the emulsion of the film F is separated from the plane of the diffraction grating by a distance such that the plane of the film lies at the second or overlapping focus of the diffraction grating. The result is as shown in Figure 7, that each color band image on the film receives light from at least two different clear lines of the grating with the exception of the blue band which receives light from three clear lines of the grating. However, because of the construction of the filter as previously described, the total amount of light received by the film with respect to the blue band is the same as that received with respect to the red and green bands. It will be apparent that each color band at the plane of the emulsion is compounded of light from two or three different parts of the lens so that the tendency toward color fringing when photographing objects which are slightly out of focus, which arises when using only part of the lens for each color, is very largely eliminated. It will be apparent, of course, that the bands of the filter are likewise placed exactly horizontal, or in any event the bands of the filter and the ruled lines of the diffraction grating must lie exactly parallel. The net result of this arrangement is that on the sensitized coating of the negative there is projected through each clear line of the diffraction grating a complete image of the multi-color filter, the adjacent images lying exactly contiguous and in regular repetition, and similar colors in each image being superimposed.

It follows, therefore, that when a scene is photographed with this arrangement a black and white three-color separation negative F thereof is produced, composing a multitude of extremely fine linear densities. The linear densities, of course, are directly proportional to the intensity of the various colors in the scene photographed, particularly if the colors of the filter are suitably masked to be in balance with the color sensitivity of the film used. It will be obvious that under the procedure of this invention complete control of the final color balance can be maintained by means of the control of the filter in the taking and the control of the balance in printing, all with reference to the color sensitivity of the positive film used in making the prints.

Such a negative is diagrammatically illustrated in Figure 8. In considering this figure, as well as the three following figures, it may be assumed for the purposes of description that a longitudinal section of the film is shown at right angles to the width thereof. For the purpose of illustrating the invention the negative of Figure 8 has been assumed to have been exposed to a red target, a black target, and a yellow target. At the point of exposure to the red target through, of course, the filter and diffraction grating as previously described there will be an exposure in the red line, the green and blue bands of the filter, of course, holding back the red light. Thus the green and blue lines are unexposed. It may be noted that with respect to the red target two images of the filter are shown, namely, those coming through two adjacent clear lines of the diffraction grating. The linear densities on the negative are, of course, extremely narrow although they extend transversely across the film throughout the width of the frame thereof. In the case where a black target is photographed there will be no exposure on any of the lines, as illustrated by the clear spaces. Where a yellow target is photographed there will be exposures on the red and green lines, while the blue lines will be unexposed. The cross-section ruling illustrates, of course, where exposure has taken place. Such a negative is a three-color separation negative in black and white and when examined under a microscope will be seen to be made up of a uniform series of minute lines of varying density, extending across each frame and, of course, fully filling it lengthwise. A black and white positive F2 of such a negative after the usual processing is easily made by contact printing. This positive is then processed in the usual manner and is ready for printing.

The printing apparatus in accordance with this invention is illustrated in Figures 1, 5 and 6. A lamp housing 1 is provided with a suitable light source 2, preferably mounted so that its position can be properly adjusted, and a suitable condensing system 3, designed to focus the light from the source 2 on an aperture 1a. Positioned in front of the aperture 1a is the usual water cell 4. In front of the water cell is another lens system 6 within a suitable housing 5, the forward end of which is here provided with the multicolor filter 7. The filter may alternatively be placed between the elements of the lens 6 or on the opposite side thereof from that shown in the figures. The reference numeral 10 generally indicates the combination of the film gate and associated mechanism and the diffraction grating and its adjusting mounting in the form of a unitary physical structure.

Referring to Figures 5 and 6, there is illustrated a film gate of the well known Bell-Howell type, showing the mechanism 22 for moving the film on and off the registration pins and pulling it down. The film guide and pressure plate is shown at 21. The plate 20 is removably mounted on a suitable support 19. Mounted on the plate 20 is a plate 23, having an opening in which lies concentrically therewith a disc 24 having a central opening. The disc 24 is mounted for circumferential rotation by means of a worm 25 engaging teeth 27 on the periphery thereof. The worm is journaled in the plate 23 and is rotated by means of a thumb screw 26. The disc 24 is held in the opening of plate 23 by means of a ring 30 secured thereto by means of the screws 31 and cooperating with a corresponding ring 32 secured to the plate 23 by means of the screws 33. Thus the disc 24 may be given circumferential movement to the desired degree while it is held strictly in a plane parallel to the gate aperture. Secured to the top of plate 20 is a journal 28 for a vertical thumb screw 29 which is connected to the plate 23. The plate 23 is mounted in vertical guides formed by the bars 38 attached to the sides of plate 23. Thus by means of the thumb screw 29 the plate 23 may be given vertical movement, carrying with it the parts attached thereto, including the disc 24.

The tubular member 34, internally threaded, is provided with a flange which fits under a flange on the ring 30 so that the tubular member may be rotated. At 35 are a pair of pins mounted on the disc 24. Slidably mounted on the pins 35 is a casing 37 having an externally threaded flange, the threads of which engage the internal threads of the tubular member 34. The inner end of the casing 37 has mounted therein a diffraction grating 36 just like that previously described in connection with the taking.

With this arrangement it will be seen that the diffraction grating can be very accurately positioned with respect to the film gate. It can be moved up and down, as previously described, with the thumb screw 29. It may be rotated in a vertical plane by means of the thumb screw 26 so that the horizontal ruled lines thereon may be placed exactly parallel in a horizontal direction with the lines on the black and white positive F2 registered in the film gate 21. The diffraction grating may be adjusted in a direction at right angles to the plane of the film by rotating the tubular member 34. As this is rotated the casing 37 slides on the pins 35 so that the grating, the ruled surface of which is adjacent to the film F2, may be exactly positioned to give the overlapping focus previously described in connection with taking. It is of importance, of course, that in printing the diffraction grating have the lines thereof exactly parallel with the linear densities on the film F2 and be plane-parallel with the film.

In front of the film gate and diffraction grating assembly is placed a housing 11 having a projection lens system 13 at one end and a lens 12 to be described shortly. Positioned in front of the projection lens 13 is a screen, preferably a ground glass screen, 15, which is shown in the form of a disc mounted for rotation within a suitably apertured housing 14 by means of a motor 16 and a drive connection 17. In front of the screen 15 and positioned so as to clearly see it is a camera 18 of the usual type.

Because of film shrinkage consequent on processing even under the very best conditions, some discrepancy between the lines of the grating and the linear densities on the film may arise. Any slight misplacement of this kind will change the tint of the projected image as between top and bottom, which is undesirable. In order to overcome this another lens system 9 similar to the lens system 6 is placed between the filter and the diffraction grating in a housing 8 which may be adjusted along the axis of the apparatus in either direction by any suitable form of adjusting mechanism, not here shown. The lens system 9 is so positioned as to image the aperture 1a on the film F2 to be projected and to bring the color filter within the field of the grating. A slight displacement of the lens system 9 towards or away from the grating so alters the emergent cone of light as to compensate for any over-all shrinkage or swelling of the film, resulting from the processing thereof, relative to the grating. With this arrangement the degree of divergence of the projected beam by means of which the grating "sees" the filter is changed to compensate for film shrinkage. The position of the lens system 6, the filter 7 and the lens system 9, which together image the aperture 1a on the film F2, is such that an even illumination of the film F2 at the gate with white light results.

After passing through the filter the component colors of the beam of light begin to sort themselves out and would eventually reform an image of the color filter. Even in the short distance from the film F2 to the projection lens 13 and to the rotating ground glass screen 15 there is a tendency towards discoloration due to this sorting action. The projected image of the white film aperture is no longer evenly white. To overcome this a single-convex color-corrected lens 12 is placed as near as possible to the film F2 and of such a focal length that a sharply focused image of the color filter is thrown onto the plane of the diaphragm of the projection lens 13. This results again in a uniformly white screen or illumination of the area of the disc 15 exposed through the aperture in its housing.

An unexposed mono-pack negative is placed in the camera 18. As illustrated in Figure 10 and as is well known a mono-pack negative is one having three emulsion layers, separated by thin layers of transparent gelatine, mounted on a base in superposed relation, as shown at F3 in Figure 10. The layers are respectively sensitive to the primary colors of the filter, as blue, green and red, for example. The apparatus is now set up for operation with the black and white positive film F2 running through the film gate 10 and the unexposed mono-pack negative running through the camera 18, both at the same rate of speed. The filter 7 is suitably masked to be in balance with the sensitivity of the three layers of emulsion relative to each other.

It will be apparent that the scene, of which the linear densities on the film F2 are representative, will be projected in full colors on the field of view of the rotating ground glass screen 15. This projected picture will be seen, of course, by the camera 18, with the result that it will be photographed on the mono-pack negative running therethrough. With this arrangement in one printing operation the film F3 will be exposed, as indicated in Figure 10. It has been assumed that the scene photographed was first a red target, then a black target, and then a yellow target. In the case of the red target, light will be transmitted through the red areas R of the positive F2, thereby exposing the corresponding portions of the red layer of the film F3. It is, of course, understood, as is well known, that the multiple emulsion mono-pack negative has the respective layers thereof individually sensitive to the respective colors desired, as red, green and blue in the present instance. Thus, as indicated by the cross-hatching in Figure 10, the red areas will cause an exposure in the red layer. Since the green and blue areas of the film F2 are opaque there will be no exposure in the corresponding layers of the film F3. This has been indicated in Figure 10 by the clear areas. With regard to the black target it will be seen that there are no exposures in any of the layers of the film F3 since the film F2 is black at this region. In the case of the yellow target there will be exposures in the red and green layers of the film F3 but none in the blue layer. It will be appreciated, of course, that this is but an elementary simplified description of the action which occurs. The action is simplified by reason of the fact that solid colors are being photographed. In actual scenes, with all shades and variations of colors involved, it will be apparent that while the action is fundamentally the same the resulting exposure will be more complicated, but it is chiefly to be remarked that no matter what color, shades, or tints, or combinations of colors, are thrown by printing upon the film, no two colors are ever superimposed but lie in juxtaposition.

A very important and novel characteristic of this part of the invention will now be described. The negative F3 is first developed in a bath containing thioindoxyl so that the negative is developed and at the same time is dyed red in the emulsion layers. The use of the thioindoxyl produces this result. As is well known, in the development of mono-pack negatives they are developed so as to undergo dye coupling by generation of colors complementary to the corresponding primary colors. In the present invention, however, with the particular compounds used coupled dyes are developed of the same wavelength as those to which the emulsions are sensitive so that during processing they become visibly associated with the silver images which are later destroyed, thereby eliminating the need for reversal as when complementary dyes are developed. After development in the presence of thioindoxyl the film is washed and dried. The negative is then bleached for a sufficient length of time to bleach out the color in the two top layers, that is, the blue and green layers, but not in the red layer. This is assisted by the thin layer of gelatine between the red and green sensitive emulsions. The negative is again developed but in this case there is included in the developer chlorindoxyl, and as a result the two top layers, that is, the green and blue layers, are dyed green. The film is again washed, dried and bleached. In this case the bleaching is only carried out until the uppermost layer, that is the blue layer which was dyed green, is bleached out. The film is then given a third development in a developer including indoxyl, with the result that the uppermost layer is dyed blue. The silver images are then destroyed by means of Farmer's reducer, or other suitable bath, and the film afterwards washed and dried.

It will be apparent that at the end of the process only those areas in the respective layers which have been exposed will remain dyed the corresponding colors. Thus, referring to Figure 10, the final negative F3 will be dyed in the red layer at the cross-hatched areas in the case of the red target, will have no coloring at the area corresponding to the black target, and in the case of the yellow target will be dyed red and green in the respective layers as indicated by the cross-hatching.

To produce a mono-pack positive from this negative it is only necessary to print the negative F3 on a mono-pack positive F4 by contact printing with white light. This positive is then developed in the same manner as the negative so that the final positive is as diagrammatically illustrated in Figure 11. The area for the red target has an exposure in the red layer which is dyed red after the film is fully developed. The areas corresponding to the green and blue portions of the negative, however, are dyed red, green and blue, in the respective layers, which colors together make black, or in other words when this positive is projected no light is transmitted through those areas. A similar result occurs in the black target regions. In the case of the yellow target region, the red and green layers are dyed these respective colors while the areas corresponding to the blue position are dyed red, green and blue in the respective layers, these colors producing black when projected.

It will be understood, as previously mentioned, that these linear densities are extremely fine, that is, narrow transversely of their length, so that when a picture thus made of elementary color areas is projected the eye will resolve it into an accurate, vivid reproduction of the original scene. It will be apparent to those familiar with this art that the mono-pack negatives and positives as produced by this method are of the additive type, as distinguished from the subtractive type always heretofore produced with the mono-pack. The result is that the projected picture for a given intensity of projected light is brighter and much purer colors result owing to the absence of color super-imposition. It is, of course, apparent from the above description that the method of producing prints is extremely simplified as compared to those used today, which simplification results in a large part from the fact that the problem of accurately registering a plurality of individual color separation negatives is eliminated. The colors of no two layers are ever superimposed, and interference and degradation are thereby eliminated.

It is to be pointed out that applicant in naming the particular chemical compounds which by dye coupling develop the primary colors does not desire to be limited to the particular compounds recited because there are other known compounds suitable for this purpose. It is also to be noted that instead of developing these dyes by dye coupling they may be developed by dye reduction, a procedure likewise well known in the present practice of producing subtractive positives and negatives but not heretofore used in producing additive positives and negatives.

It will also be obvious to those skilled in the art that the invention herein disclosed is equally applicable and advantageous when other methods of developing are employed. For example, it will be obvious that instead of developing the color negatives and positives by means of dye coupling an identical result can be obtained after exposure by immersing the film after development and mordanting in a suitable red dye, drying it, bleaching the two top layers, re-dyeing these in a suitable green dye bath, drying it, bleaching the top layer, and dyeing this in a suitable blue dye bath, and finally, after destruction of the silver image, washing and drying the film. The result will be, as in the case of the process previously described, to produce additive multi-color mono-pack negatives and positives.

It will be equally clear that the principles and advantages of this invention are applicable to cases where the mono-pack negatives and positives are not made from black and white color separation negatives and positives. For example, a multi-color mono-pack negative could be placed in an ordinary camera provided with a color filter and a diffraction grating, as in the case of taking with a black and white separation negative, and directly exposed to the scene. This negative could then be developed as previously explained, and printed by contact printing as before to thereby produce the mono-pack negatives and positives of the additive type comprising in part this invention.

The main reason why a color separation black and white negative is employed is because, as is well known at the present time, the emulsions of mono-pack negatives are not nearly as fast as the emulsions of black and white negatives. However, in the case of stills, it is apparent that the mono-pack negative could be directly exposed, thereby eliminating the black and white negative and the positive print thereof. Should, however, sufficiently fast mono-pack negatives be developed they could be directly exposed in an ordinary camera through a multi-color filter and diffraction grating to produce when fully developed the negative illustrated in Figure 10 herein from which the mono-pack positive of Figure 11 could be produced by contact printing with white light.

It will be apparent from the above description that the novel features of this invention are subject to wide variations without departure from the scope of the novel subject matter herein disclosed. I do not, therefore, desire to be strictly limited to the disclosure as given for the purposes of illustration, but rather to the scope of the claims granted me.

What is claimed is:

1. A photographic apparatus, including a light source, a film gate having an aperture, a diffraction grating mounted adjacent to said aperture, lenses for focusing the light from said source on said aperture, a multi-color filter adjacent said lenses, a camera positioned on the side of said aperture opposite to said grating, a transparent screen interposed between said camera and aperture, and means including a color-corrected collimating lens for projecting the light transmitted through said aperture onto said screen.

2. In a projection printer, the combination including a light source, a film gate having an aperture, a diffraction grating mounted between said gate and light source and close to said gate, a multi-color filter interposed between the light source and diffraction grating, lenses for focusing the light from said source onto said aperture, a screen, a projection lens system between the film gate and screen, a camera positioned to see said screen, and means between the film gate and projection lens system for refocusing the color filter into said lens system.

3. A photographic apparatus, including a light source, a film gate having an aperture, a diffraction grating mounted adjacent to said aperture, means including lenses for focusing the light from said source on said aperture, a multi-color filter associated with said lens means, a camera positioned on the side of said aperture opposite to said grating, a transparent screen interposed between said camera and aperture, and means including a color-corrected collimating lens for projecting the light transmitted through said aperture onto said screen.

4. In a projection printer, a light source, a film gate having an aperture, a diffraction grating close to the film gate on the light source side, a filter having a plurality of sets of multi-color bands positioned between the light source and the diffraction grating, means for focusing the light source on said aperture, a projection lens system, and means for refocusing the filter into the projection lens system.

5. In a projection printer, a film gate having an aperture, a diffraction grating positioned in front of and close to said aperture, a multi-color filter in front of said grating, means for throwing a beam of light on said grating, and means for changing the beam of light falling on the grating to compensate for shrinkage of the film which passes through the gate.

6. In a projection printer, a film gate having an aperture, a diffraction grating positioned near and in front of said aperture, a multi-color filter in front of said grating, means for throwing a beam of light on said grating, means for changing the beam of light falling on the grating to compensate for shrinkage of the film which passes through the gate, a projection lens system, and means for re-focusing the filter into the projection lens system.

7. In a projection printer, a film gate having an aperture, a diffraction grating positioned adjacent said aperture, means for adjusting the diffraction grating axially, radially and circumferentially with respect to said aperture, a multi-color filter in front of said grating, means for throwing a beam of light on said grating, and means for changing the cone of the beam of light emerging from said last mentioned means to compensate for shrinkage of the film which is passed through said gate.

8. In projection printer, a light source, a film gate having an aperture, a diffraction grating positioned between the light source and the film gate and close to said gate, a multi-color filter between the light source and the diffraction grating, means for focusing the light source on said aperture, a projection lens system, means for re-focusing the filter into the projection lens system, and means for copying the projected colored image.

SAMUEL B. GRIMSON.